United States Patent [19]

Ohtake et al.

[11] Patent Number: 5,379,294
[45] Date of Patent: Jan. 3, 1995

[54] MULTIPURPOSE ANALOG FRONT-END CIRCUIT

[75] Inventors: Hisao Ohtake; Seiji Okamoto; Shoji Fujii, all of Tokyo, Japan

[73] Assignee: Oki Electric Industry Co., Ltd., Tokyo, Japan

[21] Appl. No.: 676,820

[22] Filed: Mar. 28, 1991

[30] Foreign Application Priority Data

Mar. 30, 1990 [JP] Japan .................... 2-83163

[51] Int. Cl.6 .................... H04L 5/14; H04B 1/54
[52] U.S. Cl. .................... 370/30; 333/173
[58] Field of Search .................... 370/30, 24; 375/7, 8; 379/97, 98; 330/310; 333/173

[56] References Cited

U.S. PATENT DOCUMENTS 4,852,080 7/1989 Ohtake et al. .................... 370/30
4,931,250 6/1990 Greszczuk .................... 375/8

OTHER PUBLICATIONS

Yamamota, Ohtake, and Kune, "*An Analog Front End for 2400-bit/s Split-Band Full-Duplex Modems,*" IEEE Journal of Solid-State Circuits, vol. SC-21, No. 6, Dec. 1986, pp. 941-946.

Primary Examiner—Wellington Chin
Attorney, Agent, or Firm—Edward D. Manzo

[57] ABSTRACT

An analog front-end circuit has a low-group low-pass filter and a low-group high-pass filter connected in series, a high-group low-pass filter and a high-group high-pass filter connected in series, and switching means enabling the low-group high-pass filter and high-group low-pass filter to be connected in series, thus providing three bandpass filters with different passbands.

26 Claims, 5 Drawing Sheets

F I G. 4
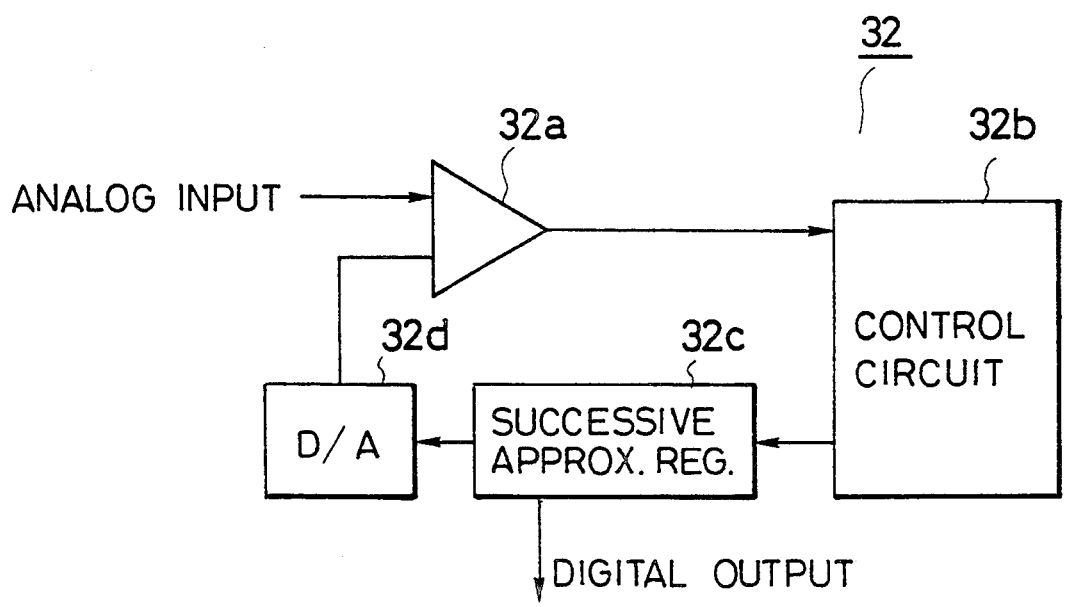

MULTIPURPOSE ANALOG FRONT-END CIRCUIT

BACKGROUND OF THE INVENTION

This invention relates to a multipurpose analog front-end circuit used, for example, in a modulating-/demodulating device (hereinafter referred to as a modem) that supports both half-duplex and full-duplex communication.

An analog front end is a circuit that interfaces between an analog signaling system such as an analog telephone line and digital signal-processing circuits such as the modulating and demodulating circuits of a modem. The analog front end of a half-duplex 1200-bit/s modem conforming to CCITT recommendation V.23, for example, has a bandpass filter comprising a low-pass filter (LPF) and a high-pass filter (HPF) connected in series, the LPF having a cutoff frequency of 2300 Hz and the HPF having a cutoff frequency of 1100 Hz. The combined passband is accordingly 1100 to 2300 Hz.

The analog front end of a full-duplex modem has two bandpass filters, each comprising an LPF and an HPF connected in series. A typical modem for a personal computer supports CCITT recommendations V.22 and V.22bis for 1200-bit/s and 2400-bit/s data rates: the low-group bandpass filter has a passband of 800 to 1600 Hz, while the high-group bandpass filter has a passband of 2000 to 2800 Hz. The low-group bandpass filter is used for transmitting and the high-group bandpass filter for receiving (or vice versa), permitting communication in both directions at once.

In previous modems that supported both half-duplex and full-duplex communications (referred to hereinafter as multi-standard modems), the analog front-end circuits had three bandpass filters, each comprising an LPF and an HPF connected in series as described above. Two of the bandpass filters were used for full-duplex communications and the third bandpass filter was used for half-duplex communications. A problem is that the circuits are complex and expensive to fabricate. Thus a multi-standard modem incorporating three bandpass filters is significantly more costly than a full-duplex modem having only two bandpass filters. Even when the analog front end is integrated onto a single semiconductor chip, with three separate bandpass filters the chip becomes large in size, so fewer chips can be fabricated from a single semiconductor wafer. The result is a rise in the cost per chip, and in the cost of the modem (or other equipment) in which the chip is employed.

SUMMARY OF THE INVENTION

An object of the present invention is accordingly to simplify the structure of a multipurpose analog front-end circuit.

Another object is to reduce the cost of a multipurpose analog front-end circuit.

Yet another object is to reduce the size of a multipurpose analog front-end circuit.

An analog front-end circuit comprises a low-group bandpass filter having a low-group low-pass filter and a low-group high-pass filter connected in series, a high-group bandpass filter having a high-group low-pass filter and a high-group high-pass filter connected in series, and a switching circuit for connecting the high-group low-pass filter and the low-group high-pass filter in series.

BRIEF DESCRIPTION OF THE DRAWINGS

FIG. 4 is a circuit diagram of the A/D converter in FIG. 1.

DETAILED DESCRIPTION OF THE INVENTION

Novel analog front-end circuits embodying the present invention will be described with reference to FIGS. 1 and 6. Circuit diagrams of their major components will be shown in FIGS. 2, 3, and 4. Their operation will be explained with reference to a multi-standard modem employing the first novel analog front-end circuit, illustrated in FIG. 5. All of these drawings are exemplary in nature and do not restrict the scope of the invention, which should be determined solely from the appended claims.

Figure 1:
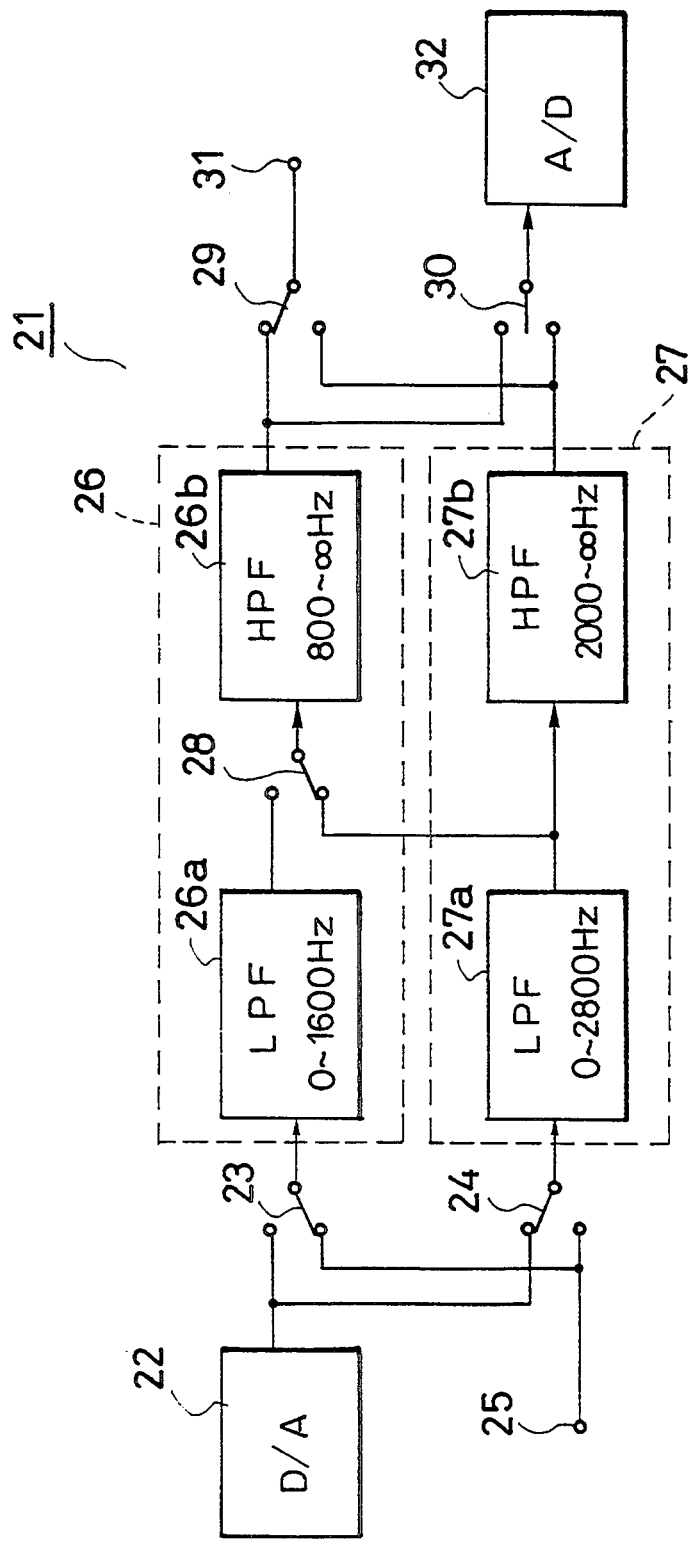
FIG. 1 is a block diagram of a novel analog front-end circuit.

The novel analog front-end circuit 21 in FIG. 1 comprises a digital-to-analog (D/A) converter 22, switching means 23 and 24, an analog input terminal 25, a low-group bandpass filter 26, a high-group bandpass filter 27, switching means 28, 29, and 30, an analog output terminal 31, and an analog-to-digital (A/D) converter 32. The switching means 23 connects either the D/A converter 22 or the analog input terminal 25 to the low-group bandpass filter 26. The switching means 24 connects either the D/A converter 22 or the analog input terminal 25 to the high-group bandpass filter 27. The switching means 29 connects either the low-group bandpass filter 26 or the high-group bandpass filter 27 to the analog output terminal 31. The switching means 30 connects either the low-group bandpass filter 26 or the high-group bandpass filter 27 to the A/D converter 32.

The low-group bandpass filter 26 comprises an LPF 26a that receives input from the switching means 23, and a HPF 26b that feeds output to the switching means 29 and 30. The output of the low-group LPF 26a can be fed as input to the low-group HPF 26b through the switching means 28.

The high-group bandpass filter 27 comprises a high-group LPF 27a that receives input from the switching means 24, and a high-group HPF 27b that feeds output to the switching means 29 and 30. The output the high-group LPF 27a is connected directly as input to the high-group HPF 27b, and can also be connected as input to the low-group HPF 26b through the switching means 28. The switching means 28 thus selects the output of either the low-group LPF 26a or the high-group LPF 27a for input to the low-group HPF 26b.

Next the structure of the individual elements in FIG. 1 will be described in more detail.

Figure 2:
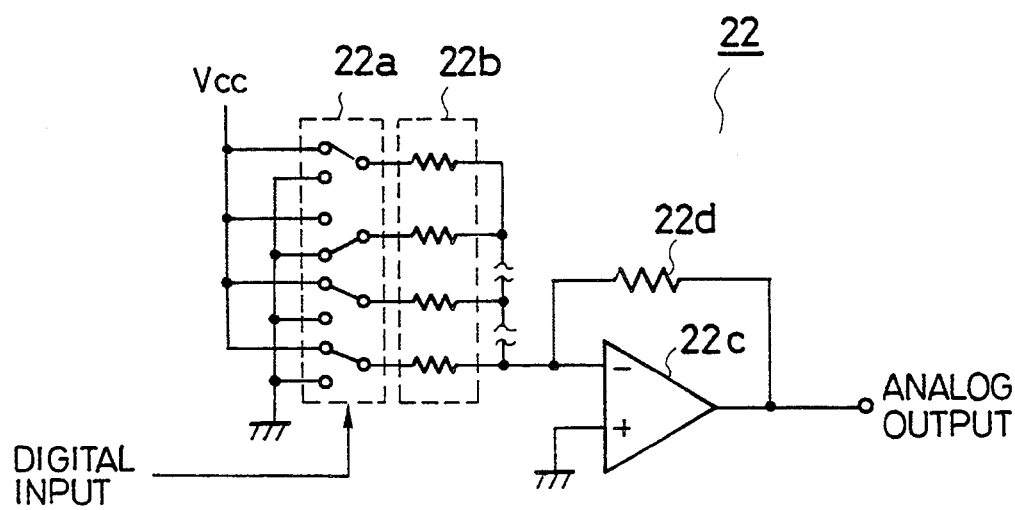
FIG. 2 is a circuit diagram of the D/A converter in FIG. 1.

With reference to FIG. 2, the D/A converter 22 is a well-known circuit comprising a switching array 22a, a resistor array 22b, an operational amplifier 22c, and a feedback resistor 22d. To briefly describe the operation of this circuit, switching elements in the switching array 22a are controlled by respective bits of a digital input signal. The resistors in the resistor array 22b have resistance values in the ratio of successive powers of two. The operational amplifier 22c adds the currents flowing through those resistors that the switching array 22a connects to the power supply (Vcc) to produce an analog output signal representative of the digital input signal.

The switching means 23, 24, 28, 29, and 30 comprise, for example, MOS transistors controlled by control signals applied to their gate electrodes. The invention is not restricted to MOS transistor switching means, however; bipolar transistors or other types of switching elements may be used instead.

Figure 3:
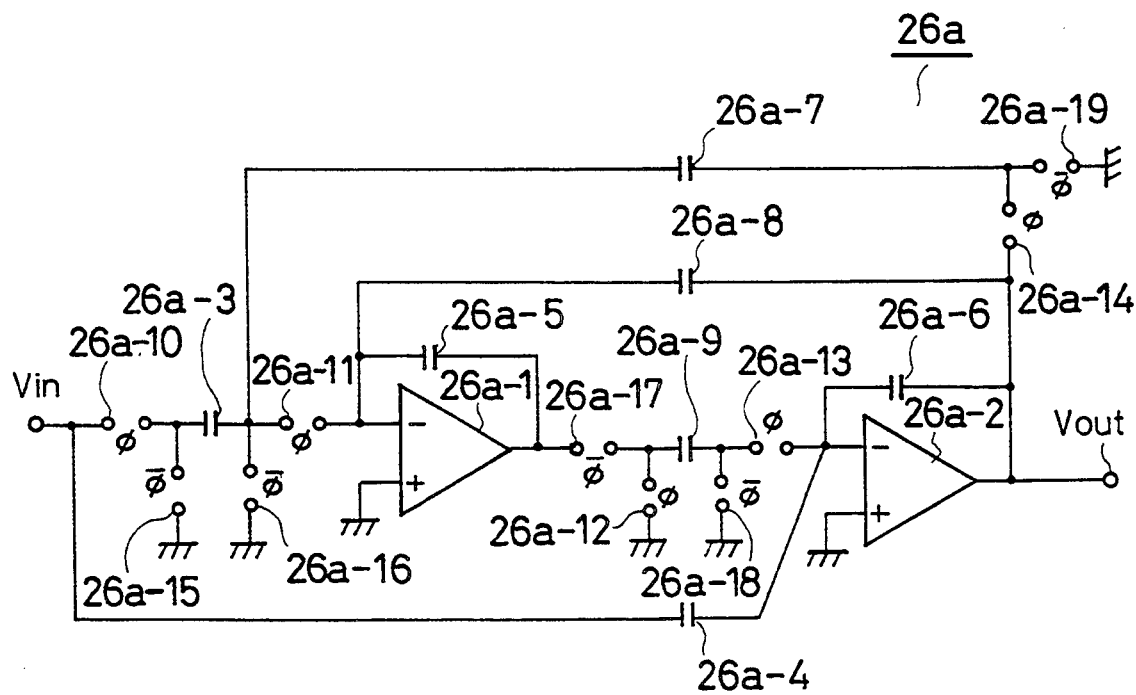
FIG. 3 is a circuit diagram of the low-group LPF in FIG. 1.

With reference to FIG. 3, the low-group LPF 26a is a switched-capacitor filter of the dual op-amp type, having: operational amplifiers 26a-1 and 26a-2, input capacitors 26a-3 and 26a-4, hold capacitors 26a-5 and 26a-6, feedback capacitors 26a-7 and 26a-8, and a capacitor 26a-9; switching means 26a-10 to 26a-14 that switch on and off under control of a clock signal Φ; and switching means 26a-15 to 26a-19 that switch on and off under control of the inverted clock signal. This circuit is well known, so a detailed description of its interconnections and operation will be omitted. The capacitances of the capacitors 26a-3 to 26a-9 and other circuit parameters are set so that the passband of the low-group LPF 26a is 0 to 1600 Hz.

The low-group HPF 26b, the high-group LPF 27a, and the high-group HPF 27b are similar in structure to the low-group LPF 26a, but have different passbands. The passband of the low-group HPF 26b is 800 Hz to infinity. The passband of the high-group LPF 27a is 0 to 2800 Hz. The passband of the high-group HPF 27b is and 2000 Hz to infinity. The passband of the low-group bandpass filter 26 is accordingly 800 to 1600 Hz, while the passband of the high-group bandpass filter 27 is 2000 to 2800 Hz.

With reference to FIG. 4, the A/D converter 32 comprises, for example, a comparator 32a, a control circuit 32b, a successive approximations register 32c, and a D/A converter 32d. A detailed description of this well-known circuit will be omitted. Suffice it to say that an analog input signal received from the low-group HPF 26b or the high-group HPF 27b in FIG. 1 is converted to a digital signal output from the successive approximations register 32c in FIG. 4.

Figure 5:
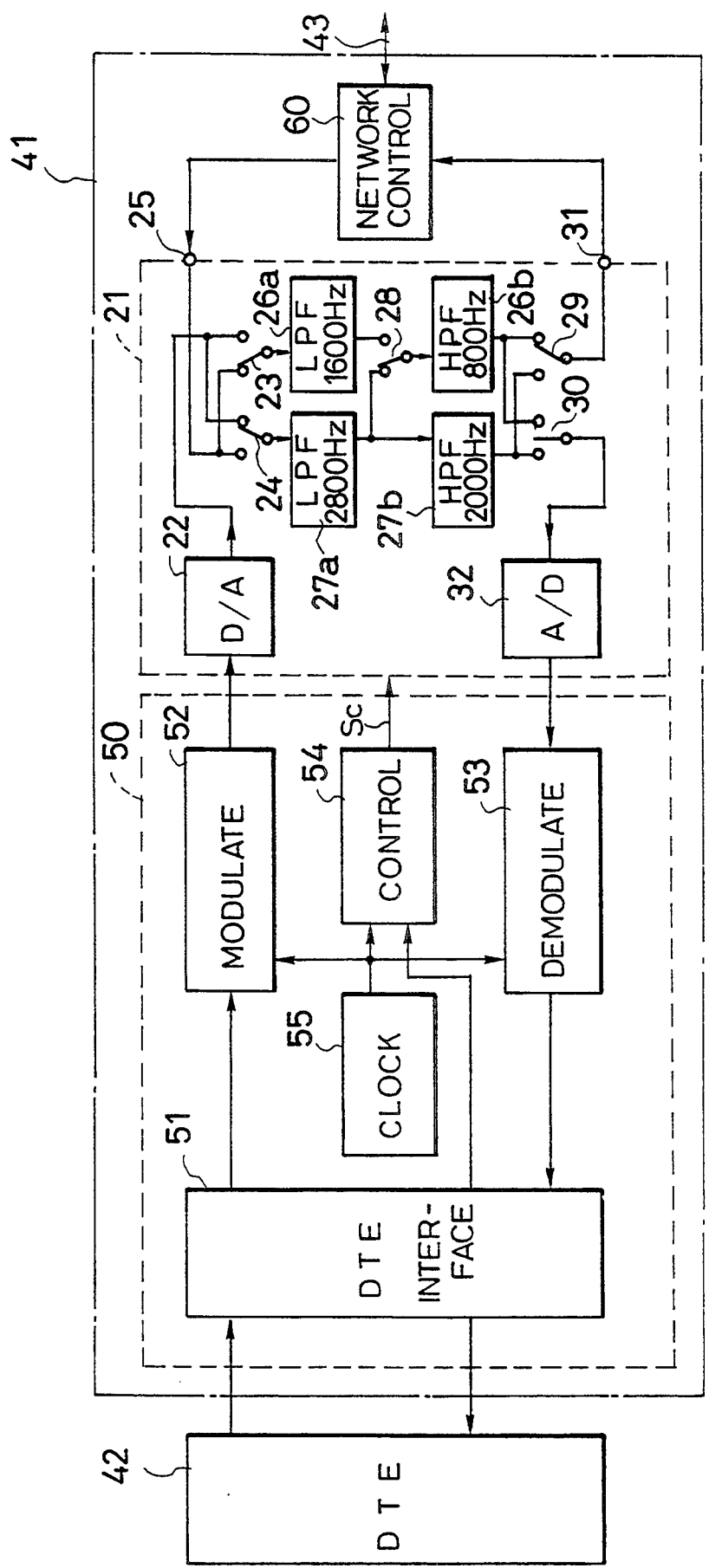
FIG. 5 is a block diagram of a modem using the analog front-end circuit of FIG. 1.

FIG. 5 shows a modem 41 for interfacing between a data terminal equipment (DTE) 42 such as a personal computer and an analog signal line 43 such as a telephone line. The modem 41 comprises the novel analog front-end circuit 21, which is denoted using the same reference numerals as in FIG. 1, a digital signal-processing section 50, and a network control circuit 60. The digital signal-processing section 50 comprises a DTE interface 51, a modulating circuit 52, a demodulating circuit 53, a control circuit 54, and a clock circuit 55. The output of the modulating circuit 52 is fed to the input of the D/A converter 22 in the analog front-end circuit 21. The output of the A/D converter 32 in the analog front-end circuit 21 is fed to the demodulating circuit 53. The control circuit 54 supplies control signals collectively denoted Sc that control the switching means 23, 24, 28, 29, and 30 of the analog front-end circuit 21. The analog input terminal 25 and analog output terminal 31 of the analog front-end circuit 21 are connected to the network control circuit 60, which is connected to the analog signal line 43.

The operation of the analog front-end circuit 21 will now be described with reference to FIG. 5, treating the cases of full-duplex communication and half-duplex communication separately.

In full-duplex communication, the switching means 28 connects the output of the low-group LPF 26a to the input of the low-group HPF 26b (the opposite setting to the one shown in the drawing). The other switching means are set according to whether the modem 41 operates in originate mode or answer mode.

In originate mode the modem 41 transmits low-group signals and receives high-group signals, so the switching means 23, 24, 29, and 30 are set as follows. The switching means 23 connects the output of the D/A converter 22 to the low-group LPF 26a. The switching means 24 connects the analog input terminal 25 to the high-group LPF 27a. The switching means 29 connects the output of the low-group HPF 26b to the analog output terminal 31. The switching means 30 connects the output of the high-group HPF 27b to the A/D converter 32.

In originate mode, transmit data generated by the DTE 42 is fed through the DTE interface 51 to the modulating circuit 52 where it modulates a digital carrier signal. The digitally modulated signal is converted to an analog signal by the D/A converter 22, filtered by the low-group LPF 26a and low-group HPF 26b to remove unwanted frequency components outside the range from 800 to 1600 Hz, sent via the analog output terminal 31 and the network control circuit 60 to the analog signal line 43, and transmitted over the analog signal line 43 to a distant device (not shown in the drawing).

Signals received from the distant device are fed from the analog signal line 43 via the network control circuit 60 and the analog input terminal 25 to the switching means 24, filtered by the high-group LPF 27a and the high-group HPF 27b to remove unwanted frequency components outside the range from 2000 to 2800 Hz, then converted to a digital signal by the A/D converter 32. This digital signal is demodulated by the demodulating circuit 53 to recover the receive data, which is sent via the DTE interface 51 to the DTE 42.

The transmit and receive signals follow separate paths between the DTE 42 and the network control circuit 60. Data can therefore be transmitted and received simultaneously.

When the modem 41 operates in full-duplex answer mode the settings of the switching means 23, 24, 29, and 30 are reversed. The operation is exactly the same as before except that the transmit signal is filtered by the high-group LPF 27a and the high-group HPF 27b, and the receive signal is filtered by the low-group LPF 26a and the low-group HPF 26b.

In half-duplex communication, the switching means 28 connects the output of the high-group LPF 27a to the input of the low-group HPF 26b. The modem 41 now operates in either transmit mode or receive mode; It does not transmit and receive simultaneously.

In half-duplex transmit mode, the switching means 24 connects the output of the D/A converter 22 to the high-group LPF 27a, and the switching means 29 connects the output of the low-group HPF 26b to the analog output terminal 31, as shown in the drawing. Transmit data generated by the DTE 42 is converted to an analog signal by the modulating circuit 52 and the D/A converter 22 as described in full-duplex communication, filtered by the high-group LPF 27a and the low-group HPF 26b, then sent via the network control circuit 60 to the analog signal line 43.

In half-duplex receive mode, the switching means 24 connects the analog input terminal 25 to the high-group LPF 27a, and the switching means 30 connects the low-group HPF 26b to the A/D converter 32. The receive signal from the analog signal line 43 is thus fed via the network control circuit 60 to the switching means 24, filtered by the high-group LPF 27a and the low-group HPF 26b, converted to a digital signal by the A/D converter 32, demodulated by the demodulating circuit 53, and furnished via the DTE interface 51 to the DTE 42.

The passband of the bandpass filter used in half-duplex communications, comprising the high-group LPF 27a and the low-group HPF 26b, is 800 Hz to 2800 Hz. This is somewhat wider than the 1100-to-2300Hz passband usually used for 1200-bit/s half-duplex communications, but if the modem is designed to be capable of 2400-bit/s communications in full-duplex mode, then at the slower rate of 1200 bits/s it is an easy matter to compensate for the signal-to-noise penalty caused by the widened half-duplex passband.

Figure 6:
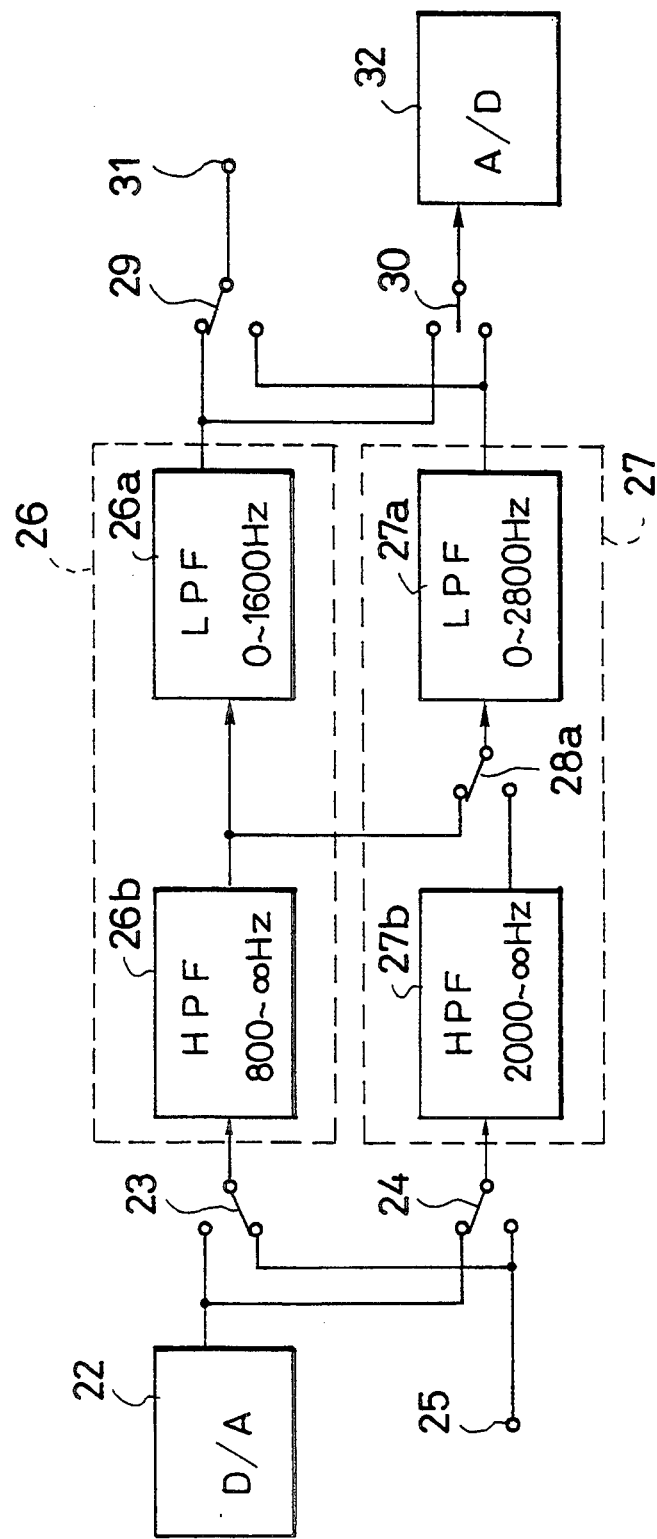
FIG. 6 is a block diagram of another novel analog front-end circuit.

FIG. 6 shows another novel analog front-end circuit. This circuit is identical to the one in FIG. 1 except for the manner in which the high-pass and low-pass filters are mutually interconnected and connected to the switching means. Elements common to both FIGS. 1 and 6 are denoted by the same reference numerals.

In FIG. 6 high-pass filtering is performed before low-pass filtering. Thus the low-group HPF 26b receives input from the switching means 23, feeds output directly to the low-group LPF 26a, and feeds the same output via a switching means 28a to the high-group LPF 27a. The high-group HPF 27b receives input from the switching means 24 and feeds output via the switching means 28a to the high-group LPF 27a. The output of the low-group LPF 26a and the output of the high-group LPF 27a are fed to the switching means 29 and 30.

The switching means 28a, which is analogous to the switching means 28 in FIG. 1, thus selects either the output of the low-group HPF 26b or the output of the high-group HPF 27b as input to the high-group LPF 27a.

The operation of the analog front-end circuit in FIG. 6 is identical to the operation of the analog front-end circuit in FIG. 1. The passbands of the low-group bandpass filter 26, the high-group bandpass filter 27, and the half-duplex bandpass filler comprising the low-group HPF 26b and the high-group LPF 27a are also the same as in FIG. 1.

As is clear from FIGS. 1 and 6, the novel analog front-end circuit is hardly at all more complex than a conventional analog front-end circuit for full-duplex communications, the only additional element being the switching means 28 in FIG. 1 or the switching means 28a in FIG. 6; yet the novel analog front-end circuit supports both full-duplex and half-duplex communications. The novel analog front-end circuit thus enables a multi-standard modem to be manufactured at substantially the same cost as a conventional full-duplex modem, and at a substantially lower cost than a conventional multi-standard modem. In particular, the novel analog front-end circuit can be integrated onto a semiconductor chip without increasing the chip size or driving up the per-chip fabrication cost.

As will be obvious to one skilled in the art, the embodiments illustrated in FIGS. 1 and 6 can be modified in various ways without departing from the spirit and scope of the present invention. Further components can be added to the analog front-end circuits In FIGS. 1 and 6, such as an automatic gain control (AGC) circuit to adjust the amplitude of the filtered receive signal, or an all-pass filter for group delay equalization, for example.

The invention is furthermore not restricted to the use of D/A and A/D converters and filters of the types shown in FIGS. 2 to 4. Other types of filters and converters can be employed instead. The passbands of the filters can also be modified as required by the application, and the application need not be a modem as illustrated in FIG. 5; the novel front-end circuit can be applied in various other devices.

What is claimed is:

1. A front-end circuit for bandpass-filtering a first analog signal and a second analog signal, having a first mode of operation and a second mode of operation, comprising:
   a low-group bandpass filter having a low-group high-pass filter and a low-group low-pass filter connected in series, said low-group bandpass filter used in said first mode of operation for receiving and bandpass-filtering said first analog input signal, thereby generating a first analog output signal;
   a high-group bandpass filter having high-group high-pass filter and a high-group low-pass filter connected in series, said high-group bandpass filter used simultaneously in said first mode of operation for receiving and bandpass-filtering said second analog input signal, thereby generating a second analog output signal; and
   a switching circuit for connecting said low-group high-pass filter and said high-group low-pass filter in series in said second mode of operation, thereby forming a filter for receiving and bandpass-filtering said first analog input signal at one time and said second analog input signal at another time, thus generating both said first analog output signal and said second analog output signal at different times.

2. The circuit of claim 1, wherein said low-group high-pass filter has a first cutoff frequency, said low-group low-pass filter has a second cutoff frequency higher than said first cutoff frequency, said high-group high-pass filter has a third cutoff frequency higher than said second cutoff frequency, and said high-group low-pass filter has a fourth cutoff frequency higher than said third cutoff frequency.

3. An analog front-end circuit, comprising:
   an analog input terminal for input of a first analog signal;
   an analog output terminal for output of a second analog signal;
   a D/A converter for converting a digital signal to a third analog signal;
   an A/D converter for converting a fourth analog signal to a digital signal;
   a low-group high-pass filter having a first cutoff frequency;
   a low-group low-pass filter having a second cutoff frequency higher than said first cutoff frequency;
   a high-group high-pass filter having a third cutoff frequency;
   a high-group low-pass filter having a fourth cutoff frequency higher than said third cutoff frequency, an output of said high-group low-pass filter being fed as an input to said high-group high-pass filter;

a first switching circuit for selecting said first analog signal or said third analog signal and feeding the selected analog signal as an input to said low-group low-pass filter;

a second switching circuit for selecting said first analog signal or said third analog signal and feeding the selected analog signal as an input to said high-group long-pass filter;

a third switching circuit for selecting an output of said low-group low-pass filter or said output of said high-group low-pass filter and feeding the selected output as an input to said low-group high-pass filter;

a fourth switching circuit for selecting an output of said low-group high-pass filter or an output of said high-group high-pass filter and feeding the selected output to said analog output terminal as said second analog signal; and a fifth switching circuit for selecting an output of said low-group high-pass filter or an output of said high-group high-pass filter and feeding the selected output to said A/D converter as said fourth analog signal.

4. The circuit of claim 3, wherein said third cutoff frequency is higher than said second cutoff frequency.

5. The circuit of claim 3, wherein said first cutoff frequency is substantially 800 Hz, said second cutoff frequency is substantially 1600 Hz, said third cutoff frequency is substantially 2000 Hz, and said fourth cutoff frequency is substantially 2800 Hz.

6. An analog front-end circuit, comprising:
an analog input terminal for input of a first analog signal;
an analog output terminal for output of a second analog signal;
a D/A converter for converting a digital signal to a third analog signal;
an A/D converter for converting a fourth analog signal to a digital signal;
a low-group high-pass filter having a first cutoff frequency;
a low-group low-pass filter having a second cutoff frequency higher than said first cutoff frequency, an output of said low-group high-pass filter being fed as input to said low-group low-pass filter;
a high-group high-pass filter having a third cutoff frequency
a high-group low-pass filter having a fourth cutoff frequency higher than said third cutoff frequency;
a first switching circuit for selecting said first analog signal or said third analog signal and feeding the selected analog signal as an input to said low-group high-pass filter;
a second switching circuit for selecting said first analog signal or said third analog signal and feeding the selected analog signal as an input to said high-group high-pass filter;
a third switching circuit for selecting said output of said low-group high-pass filter or an output of said high-group high-pass filter and feeding the selected output as input to said high-group low-pass filter;
a fourth switching circuit for selecting an output of said low-group low-pass filter or an output of said high-group low-pass filter and feeding the selected output to said analog output terminal as said second analog signal; and a fifth switching circuit for selecting said output of said low-group low-pass filter or said output of said high-group low-pass filter and feeding the selected output to said A/D converter as said fourth analog signal.

7. The circuit of claim 6, wherein said third cutoff frequency is higher than said second cutoff frequency.

8. The circuit of claim 6, wherein said first cutoff frequency is substantially 800 Hz, said second cutoff frequency is substantially 1600 Hz, said third cutoff frequency is substantially 2000 Hz, and said fourth cutoff frequency is substantially 2800 Hz.

9. A method of front-end filtering analog transmit data and analog receive data in a modem supporting both half-duplex and full-duplex communications, comprising the steps of:
configuring a first path in series through a first low-pass filter in said modem and a first high-pass filter in said modem;
passing said analog transmit data through one path among said first and second paths and passing said analog receive data through another path among said first and second paths for full duplex operation:
configuring a third path in series through said first high-pass filter and said second low-pass filter; and
passing said analog transmit data and said analog receive data through said third path for half-duplex operation.

10. The method of claim 9 wherein said third path is configured to include the second low pass filter and the first high pass filter.

11. The method of claim 10 wherein said step of configuring a third path comprises controlling an input to the first high-pass filter.

12. The method of claim 10 wherein said step of configuring a third path comprises controlling an input to the second low-pass filter.

13. A front-end circuit operable in a first mode and a second mode, comprising:
a first input terminal;
a first output terminal;
a second input terminal;
a second output terminal;
a first bandpass filter having a first low-pass filter and a first high-pass filter connected in series between said first input terminal and said first output terminal so as to receive a first analog signal at said first input terminal, to filter said first analog signal by means of said first low-pass filter and said first high-pass filter, and thereby to output a first filtered analog signal at said first output terminal in said first mode;
a second bandpass filter having a second low-pass filter and a second high-pass filter connected in series between said second input terminal and said second output terminal, so as to receive a second analog signal from said second input terminal, to filter said second analog signal by means of said second low-pass filter and said second high-pass filter, and thereby to output a second filtered analog signal at said second output terminal in said first mode; and
a switching circuit for disconnecting said first high-pass filter from said first low-pass filter in said second mode and connecting said first high-pass filter and said second low-pass filter in series in said second mode so as to receive an analog input signal from said second input terminal, to filter the analog input signal by means of said second low-pass filter and said first high-pass filter, and thereby to output a third filtered analog output signal at said first output terminal in said second mode.

14. The circuit of claim 13 wherein said first high-pass filter has a first cutoff frequency, said first low-pass filter has a second cutoff frequency which is higher than said first cutoff frequency, said second high-pass filter has a third cutoff frequency which is higher than said second cutoff frequency, and said second low-pass filter has a fourth cutoff frequency which is higher than said third cutoff frequency.

15. The circuit of claim 14, wherein said first cutoff frequency is substantially 800 Hz, said second cutoff frequency is substantially 1600 Hz, said third cutoff frequency is substantially 2000 Hz, and said fourth cutoff frequency is substantially 2800 Hz.

16. A front-end circuit operable in a first mode and a second mode, comprising:
a first input terminal for receiving a first analog input signal;
a first low-pass filter coupled to said first input terminal;
a first high-pass filter coupled to said first low-pass filter;
a first output terminal coupled to said first high-pass filter for outputting a first output signal in response to said first analog input signal filtered by means of said first low-pass filter and said first high-pass filter in said first mode:
a second input terminal;
a second low-pass filter coupled to said second input terminal;
a second high-pass filter;
a second output terminal coupled to said second high-pass filter; and
a switching circuit for either coupling said second low-pass filter and said second high-pass filter in series in said first mode so as to receive a second analog input signal from said second input terminal, to filter said second analog input signal by means of said second low-pass filter and said second high-pass filter, and to output a second output signal at said second output terminal in response to said second analog input signal, or coupling said second high-pass filter and said first low-pass filter in series in said second mode so as to receive a third analog input signal from said first input terminal, to filter said third analog input signal by means of said first low-pass filter and said second high-pass filter, and to output a third output signal at said second output terminal in response to said third analog input signal.

17. The circuit of claim 16 wherein said first low-pass filter has a first cutoff frequency, said first high-pass filter has a second cutoff frequency which is lower than said first cutoff frequency, said second low-pass filter has a third cutoff frequency which is lower than said second cutoff frequency, and said second high-pass filter has a fourth cutoff frequency which is lower than said third cutoff frequency.

18. The circuit of claim 17, wherein said first cutoff frequency is substantially 2800 Hz, said second cutoff frequency is substantially 2000 Hz, said third cutoff frequency is substantially 1600 Hz, and said fourth cutoff frequency is substantially 800 Hz.

19. A front-end circuit operable in a first mode and a second mode, comprising:
a first input terminal for receiving a first analog input signal;
a first high-pass filter coupled to said first input terminal;
a first low-pass filter coupled to said first high-pass filter;
a first output terminal coupled to said first low-pass filter for outputting a first output signal in response to said first analog input signal filtered by means of said first high-pass filter and said first low-pass filter in said first mode;
a second input terminal;
a second high-pass filter coupled to said second input terminal;
a second low-pass filter;
a second output terminal coupled to said second low-pass filter; and
a switching circuit for either (a) coupling said second high-pass filter and said second low-pass filter in series in said first mode so as to receive a second analog input signal from said second input terminal, to filter said second analog input signal by means of said second high-pass filter and said second low-pass filter, and to output a second output signal at said second output terminal in response to said second analog input signal, or (b) coupling said second low-pass filter and said first high-pass filter in series in said second mode so as to receive a third analog input signal from said first input terminal, to filter said third analog input signal by means of said first high-pass filter and said second low-pass filter, and to output a third output signal at said second output terminal in response to said third analog input signal.

20. The circuit of claim 19 wherein said first high-pass filter has a first cutoff frequency, said first low-pass filter has a second cutoff frequency higher than said first cutoff frequency, said second high-pass filter has a third cutoff frequency higher than said second cutoff frequency, and said second low-pass filter has a fourth cutoff frequency higher than said third cutoff frequency.

21. The circuit of claim 20, wherein said first cutoff frequency is substantially 800 Hz, said second cutoff frequency is substantially 1600 Hz, said third cutoff frequency is substantially 2000 Hz, and said fourth cutoff frequency is substantially 2800 Hz.

22. A method of operating a front end circuit including a first bandpass filter having a first input terminal, a first output terminal, a first low-pass filter and a first high-pass filter; and a second bandpass filter having a second input terminal, a second output terminal, a second low-pass filter and a second high-pass filter, the method comprising:
selecting a first mode or second mode of operation;
connecting the first high-pass filter and the first low-pass filter in series and connecting the second high-pass filter and the second low-pass filter in series in said first mode of operation; and
connecting the first high-pass filter and the second low pass filter in series in said second mode of operation.

23. The method of claim 22 wherein the step of connecting the first high-pass filter and the first low-pass filter in settles in the first mode of operation further includes receiving and bandpass-filtering an analog input signal to generate an analog output signal; and wherein the step of connecting the second high-pass filter and the second low-pass filter in series in said first mode of operation further includes receiving and bandpass-filtering another analog input signal to generate another analog output signal.

24. The method of claim 22 wherein the step of connecting the first high-pass filter and the second low-pass filter in series further includes receiving and bandpass-filtering a half-duplex analog input signal to generate a half-duplex analog output signal in the second mode of operation.

25. The method of claim 22 wherein said first low-pass filter has a first cutoff frequency, said first high-pass filter has a second cutoff frequency which is lower than said first cutoff frequency, said second low-pass filter has a third cutoff frequency which is lower than said second cutoff frequency, and said second high-pass filter has a fourth cutoff frequency which is lower than said third cutoff frequency.

26. The circuit of claim 25, wherein said first cutoff frequency is substantially 2800 Hz, said second cutoff frequency is substantially 2000 Hz, said third cutoff frequency is substantially 1600 Hz, and said fourth cutoff frequency is substantially 800 Hz.

* * * * *